US012311360B2

(12) United States Patent
Kaigala et al.

(10) Patent No.: US 12,311,360 B2
(45) Date of Patent: May 27, 2025

(54) SUBTRACTIVE MICROFABRICATION AND FUNCTIONALIZATION OF SUBSTRATES BY HYDRODYNAMIC FLOW CONFINEMENTS

(71) Applicants: International Business Machines Corporation, Armonk, NY (US); Technion Research & Development Foundation Limited, Haifa (IL)

(72) Inventors: Govind Kaigala, Rueschlikon (CH); Federico Paratore, Zurich (CH); Moran Bercovici, Haifa (IL); Daniel Widerker, Haifa (IL); Robert Dean Lovchik, Schoenenberg (CH)

(73) Assignees: International Business Machines Corporation, Armonk, NY (US); Technion Research & Development Foundation Limited, Haifa (IL)

( * ) Notice: Subject to any disclaimer, the term of this patent is extended or adjusted under 35 U.S.C. 154(b) by 1171 days.

(21) Appl. No.: 17/149,022

(22) Filed: Jan. 14, 2021

(65) Prior Publication Data

US 2021/0220825 A1 Jul. 22, 2021

Related U.S. Application Data

(60) Provisional application No. 62/961,747, filed on Jan. 16, 2020.

(51) Int. Cl.
*B01L 3/00* (2006.01)

(52) U.S. Cl.
CPC . *B01L 3/502707* (2013.01); *B01L 2200/0684* (2013.01); *B01L 2200/12* (2013.01); *B01L 2300/088* (2013.01); *B01L 2400/0463* (2013.01)

(58) Field of Classification Search
CPC ......... B01L 2200/0684; B01L 2200/12; B01L 2200/0673; B01L 2300/088; B01L 2400/0463; B01L 3/502707; B01L 5/0262; B81C 2201/013; B81C 2201/0133; B81C 1/00523; B81C 1/00539
See application file for complete search history.

(56) References Cited

U.S. PATENT DOCUMENTS

| | | | | |
|---|---|---|---|---|
| 2018/0364226 | A1* | 12/2018 | Bercovici | G01N 33/54366 |
| 2021/0252506 | A1* | 8/2021 | Podbiel | B01L 3/527 |

OTHER PUBLICATIONS

Grumann, M., et al., "Sensitivity enhancement for colorimetric glucose assays on whole blood by on-chip beam-guidance," Biomed Microdevices (2006), Published online May 27, 2006, pp. 209-214, vol. 8.

(Continued)

*Primary Examiner* — Kathryn Elizabeth Limbaugh
(74) *Attorney, Agent, or Firm* — Scully, Scott, Murphy & Presser, P.C.; Daniel P. Morris

(57) ABSTRACT

Patterning a substrate can be provided. A substrate is covered by an immersion liquid and a microfluidic probe head is positioned in proximity with the surface of the substrate, so as to immerse a processing surface of the probe head in the immersion liquid. Liquid flows are generated between the processing surface of the probe head and the surface of the substrate, via the probe head. The liquid flows generated include an etching flow of an etching liquid (e.g., an acid or solvent) and a processing flow of a processing liquid (e.g., a solution or suspension).

17 Claims, 6 Drawing Sheets

(56) References Cited

OTHER PUBLICATIONS

"Laser-Assisted Fabrication of Materials", Springer Series in Materials Science, 2013, 513 pages, vol. 161, Springer-Verlag Berlin Heidelberg.

Kaigala, G.V., et al., "A Vertical Microfluidic Probe", Langmuir 2011, Received Jan. 27, 2011, Revised Mar. 10, 2011, Published Apr. 8, 2011, pp. 5686-5693, vol. 27.

* cited by examiner

SUBTRACTIVE MICROFABRICATION AND FUNCTIONALIZATION OF SUBSTRATES BY HYDRODYNAMIC FLOW CONFINEMENTS

BACKGROUND

The invention relates in general to microfluidic techniques and, in particular, to methods and systems for patterning a substrate using microfluidic probes. It notably concerns methods of patterning a substrate by subtractive microfabrication followed by a selective functionalization of the substrate, e.g., with biomolecules.

Microfluidics deals with the precise control and manipulation of small volumes of fluids. Typically, such volumes are in the sub-milliliter range and are constrained to channels having heights and widths on the order of the micrometer. Prominent features of microfluidics originate from the peculiar behavior that liquids exhibit at the micrometer length scale. Flow of liquids in microfluidics is typically laminar. Volumes well below one nanoliter can be reached by fabricating structures with lateral dimensions in the micrometer range. Microfluidic devices generally refer to microfabricated devices, which are used for pumping, sampling, mixing, analyzing and dosing liquids.

Many microfluidic devices have user chip interfaces and closed flow paths. Closed flow paths facilitate the integration of functional elements (e.g., heaters, mixers, pumps, UV detector, valves, etc.) into one device while minimizing problems related to leaks and evaporation.

Microfluidics has opened the door for applications in many areas of healthcare and life sciences, such as point-of-care diagnostics (POCDs), environmental analysis, and drug discovery. POCDs strongly benefit from microfluidic technologies due to the miniaturization of tests, which enhances portability and the integration of various functions into one diagnostic device. For instance, many lateral flow assay tests rely on microfluidic functions and microfabrication to increase their precision and multiplexing capabilities.

Biochips are miniaturized microfluidic devices that integrate biological components, which enable new capabilities and higher efficiencies in the analysis and control of biological samples. The use of biochips has been rapidly growing in the field of in vitro analysis both for research applications and for diagnostics. Their manufacturing remains bound to a sequence of traditional process steps, each having its own requirements and limitations. Microchannels and microstructures are often obtained through micro-milling, laser ablation, embossing, and/or mold injection methods. A major limitation of these methods is that they are performed in a dry environment, which is unsuitable for biological components such as antibodies, DNA probes, and cells. Thus, additional preparation procedures are required prior to bio-patterning the substrates. In addition, the bio-patterning steps require re-aligning the substrates. The bio-patterning is carried out using either inkjet spotting or contact application.

SUMMARY

According to a first aspect, the present invention is embodied as a method of patterning a substrate. The method makes use of a substrate and a microfluidic probe head. The surface of the substrate is covered by an immersion liquid and the probe head is positioned in proximity with the surface of the substrate, so as to immerse a processing surface of the probe head in the immersion liquid. Next, liquid flows are generated between the processing surface of the probe head and the surface of the substrate, via the probe head. The liquid flows generated include a flow of an etching liquid (e.g., an acid or solvent) and a flow of a processing liquid (e.g., a solution or suspension). Such flows are referred to an etching flow and a processing flow. The etching flow is hydrodynamically confined inside the immersion liquid to controllably structure the surface of the substrate. This causes to create a depression in the substrate, e.g., as a result of locally etching or dissolving the substrate. The processing flow is generated after having interrupted the etching flow. The processing flow generated causes to pattern the depression created with particles (e.g., biomolecules, or metal or polymer particles) contained in the processing liquid.

The proposed approach makes it possible to fabricate a substrate with functionalized microstructures within a same process, which allows a significant simplification of the fabrication process and gain in fabrication time. In particular, the present approach allows biofunctionalized chips to be obtained, opening new possibilities for biochip design. E.g., an assay may be performed right after the patterning step.

In preferred embodiments, the depression created is subsequently patterned by hydrodynamically confining the processing flow inside the immersion liquid, vis-à-vis the depression. I.e., an additional flow confinement is used to controllably deposit the particles (e.g., biomolecules) onto the depressions formed, to improve the selectivity of the patterning.

In embodiments, the method further comprises moving the substrate in a plane parallel to an average plane of the substrate while maintaining the hydrodynamically confined flow of etching liquid, to form a microchannel in the substrate.

Shielding liquids can be used to shield the immersion liquid from the etching liquid. In embodiments, the generated liquid flows further comprise a shielding flow of a shielding liquid. The shielding flow is generated prior to generating the etching flow. The shielding flow is hydrodynamically confined inside the immersion liquid. The etching flow is subsequently generated so as to be hydrodynamically confined within the shielding flow.

Preferably, a further shielding flow (referred to as a first shielding flow) is generated prior to generating the above shielding flow (referred to as a second shielding flow). The respective liquids are accordingly referred to as a first shielding liquid and a second shielding liquid. The first shielding flow is hydrodynamically confined inside the immersion liquid, whereby the etching flow is hydrodynamically confined within the second shielding flow, which is itself hydrodynamically confined within the first shielding flow. Nested confinements are accordingly generated, inwardly, to better preserve the immersion liquid.

For example, the substrate may comprise polystyrene and the etching liquid may comprise dichloromethane. In this case, the second shielding liquid preferably comprises ethanol. Each of the first shielding liquid and the immersion liquid may for instance comprise water.

In typical embodiments, each of the first shielding flow, the second shielding flow, the etching flow, and the processing flow, is generated by ejecting liquid via an aperture of the probe head and aspirating liquid between the processing surface of the probe head and the surface of the substrate. There, various parameters can be adjusted to optimize the hydrodynamic flow confinements. For instance, a ratio between flow rates of the ejected liquid and the aspirated liquid can be set between 1/3 to 1/20. Preferably, said flow rates are, each, between 0.1 and 200 μl/min. Moreover, the probe head is preferably positioned so as for the processing surface to be at a distance of the exposed surface, wherein said distance is between 20 and 200 μm.

For example, the surface of the substrate may be controllably structured so as for one or each of an average depth and an average diameter of the created depression to be between 1 and 500 μm.

In embodiments, the method further comprises performing an assay with the patterned substrate, after having patterned the depression with the particles. The assay may possibly be imaged, thanks to an imaging system (e.g., comprising an inverted microscope).

In preferred embodiments, the processing surface of the probe head is structured so as to comprise at least two apertures, these including a first aperture for ejecting liquid toward the surface of the substrate and a second aperture for aspirating liquid between the processing surface of the probe head and the surface of the substrate. Preferably, the second aperture is curved, and the first aperture is at least partly surrounded by the second aperture, so as to optimize the evacuation of the etching liquid.

In fact, several sets of ejection/aspiration apertures may advantageously be relied on. E.g., the processing surface of the probe head may be structured so as to comprise at least four apertures, these including at least two apertures for ejecting liquid toward the surface of the substrate and at least two apertures for aspirating liquid between the processing surface of the probe head and the surface of the substrate. E.g., six or seven apertures may be formed on the processing surface.

According to another aspect, the invention is embodied as a microfluidic system. The system comprises a first motorized stage including a holder designed to receive a substrate. The first motorized stage is configured to move the substrate parallel to a reference plane, in operation. The system further includes a second motorized stage with a microfluidic probe head mounted thereon. The second motorized stage is configured to move the microfluidic probe head perpendicularly to the reference plane. Moreover, the system comprises a liquid driving system including liquid supplies connected to the probe head. The liquid supplies comprise an etching liquid supply and a processing liquid supply. The control unit is connected to the liquid driving system, the first motorized stage, and the second motorized stage. The control unit, the liquid driving system, and the probe head, are configured to sequentially generate flows of liquids (as supplied by the liquid supplies) between a processing surface of the probe head and the surface of the substrate and allow the generated flows to be hydrodynamically confined inside an immersion liquid covering the surface of the substrate, in operation.

Preferably, the liquid supplies additionally comprise a shielding liquid supply. In that case, the control unit, the liquid driving system, and the probe head are configured to generate nested flows of hydrodynamically confined liquids between the processing surface of the probe head and the surface of the substrate, in operation.

In preferred embodiments, the probe head has a processing surface that includes a liquid aspiration channel and a curved ejection channel, the latter comprising one or more air bubble traps, each of the traps including a set micropillars. The liquid aspiration channel is connected to the curved ejection channel on the processing surface, so as to allow air bubbles guided by the air bubble traps to be evacuated via the liquid aspiration channel, in operation.

BRIEF DESCRIPTION OF THE DRAWINGS

These and other objects, features and advantages of the present invention will become apparent from the following detailed description of illustrative embodiments thereof, which is to be read in connection with the accompanying drawings. The illustrations are for clarity in facilitating one skilled in the art in understanding the invention in conjunction with the detailed description. In the drawings:

FIG. 4 is a front view of the processing surface (i.e., the apex) of the microfluidic probe head seen in cross section in FIGS. 3A-3C. FIG. 5 is a front view of the apex of a bilayer microfluidic chip in a "vertical" configuration, having apertures arranged at locations corresponding to locations of apertures seen in the cross-sectional views of FIGS. 3A-3C.

Figure 1:
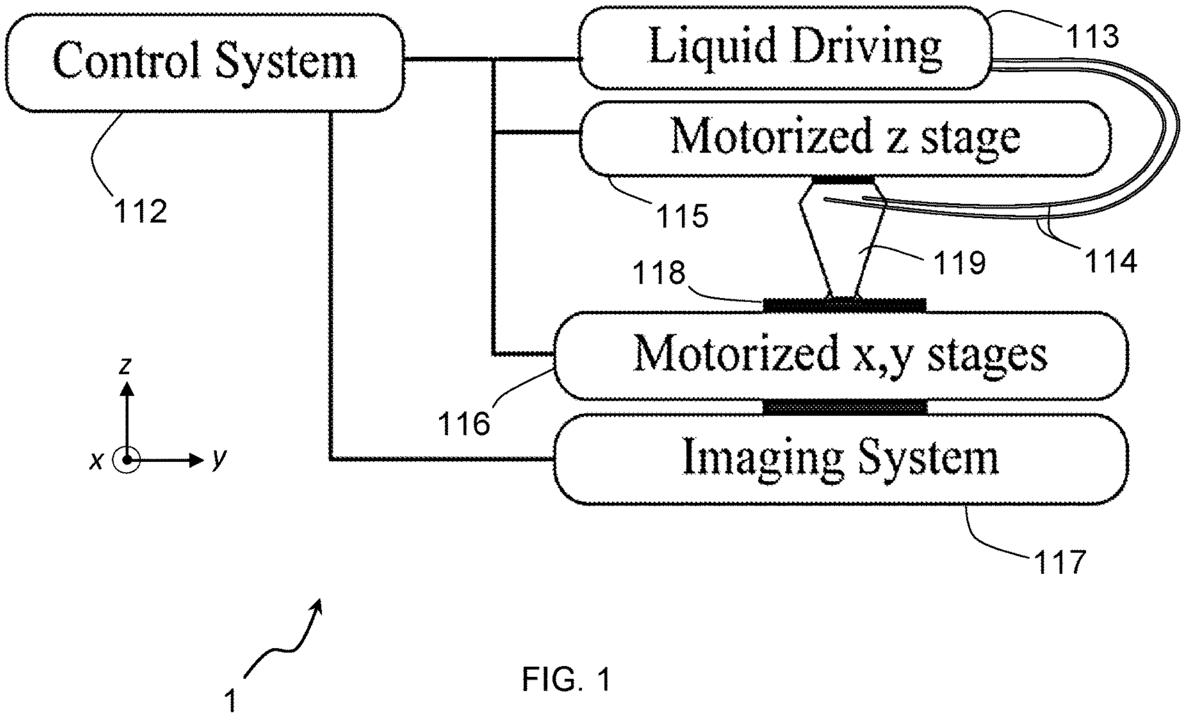
FIG. 1 is a diagram schematically illustrating components of a microfluidic system according to embodiments.

The accompanying drawings show simplified representations of devices or parts thereof, as involved in embodiments. Technical features depicted in the drawings are not necessarily to scale. Similar or functionally similar elements in the figures have been allocated the same numeral references, unless otherwise indicated.

Microfluidic systems and methods embodying the present invention will now be described, by way of non-limiting examples.

DETAILED DESCRIPTION OF EMBODIMENTS OF THE INVENTION

The following description is structured as follows. General embodiments and high-level variants are described in section 1. Section 2 addresses more specific embodiments and technical implementation details. Note, the present method and its variants are collectively referred to as "the present methods". All references Sn refer to methods steps of the flowchart of FIG. 7, while numeral references pertain to physical parts or components of the system 1 shown in FIG. 1, or to elements involved in embodiments.

1. General Embodiments and High-Level Variants

In reference to FIGS. 1, 2A-2C, 3A-3D, and 7, an aspect of the invention is first described, which concerns a method of patterning a substrate.

The method essentially involves S10 a substrate 118 and a microfluidic probe head 119, 119*a* (or probe head for short). An immersion liquid 106 is spilled over an exposed surface of the substrate 118, so as for the immersion liquid 106 to cover S20 the surface. Next, the probe head 119, 119*a* is positioned S30 in proximity with the surface of the substrate. Note, the probe head 119, 119*a* may be positioned prior to covering the substrate with the immersion liquid 106. In all cases, the probe head 119, 119*a* is brought sufficiently close to the substrate 118 so that, eventually, a processing surface (or apex) of the probe head is immersed in the immersion liquid 106.

Next, liquid flows are generated S40-S80 between the processing surface of the probe head and the surface of the substrate 118, via the probe head 119, 119*a*. The liquid flows generated include a flow 108 of an etching liquid and a flow 121 of a processing liquid. The latter comprises particles to be deposited on the surface of the substrate 118. In the following, the flows 108 and 121 are referred to as the "etching flow" and the "processing flow", respectively.

The etching flow 108 is generated so as to be hydrodynamically confined S60 inside the immersion liquid 106. A hydrodynamic flow confinement (HFC) is accordingly achieved, which allows the surface of the substrate 118 to be controllably structured. This is achieved by subtraction, thanks to the etching liquid 108, which, e.g., locally etches or dissolves the substrate. One or more depressions 120 (i.e., cavities) are accordingly created in the substrate 118.

The flows 108, 121 are sequentially generated, though not concomitantly. Rather, the processing flow 121 is generated S80 after having interrupted the etching flow 108. The flow 121 is applied so as to pattern S80 the depression 120 created at step S60 with particles 122 contained in the processing liquid. That is, particles from the processing liquid are deposited onto the depressions, where they may possibly be immobilized. After depositing the particles 122, the substrate 118 may possibly be covered with a lid (e.g., a polymer layer, not shown), if necessary.

Additional liquid flows may possibly be sequentially generated, if needed. For instance, the etching flow 108 may be generated concomitantly with one or more additional liquid flows 107, 109, i.e., shielding flows, as described later in reference to preferred embodiments.

All such liquid flows are generated thanks to conduits or channels provided in the probe head 119, 119*a*, where such conduits lead to respective apertures 100-105 formed on the processing surface of the probe head 119, 119*a*. The processing surface, or apex, of the probe head is the surface that faces the substrate, in operation, i.e., the surface through which liquids are ejected and aspirated. The probe head may further comprise mesas and other structures, such as posts and pillars. Various types of microfluidic heads can be contemplated, as discussed later in detail.

Note, the terminology "etching liquid" should be understood broadly. E.g., the etching liquid 108 may also be regarded as a milling liquid. I.e., applying this liquid causes to locally mill, grind, chemically decompose, or otherwise subtractively alter a superficial thickness of the substrate 118. The corresponding flow 108 is confined S60 laterally inside the immersion liquid 106, below the processing surface. Note, as evoked earlier, the etching liquid may only be indirectly confined in the immersion liquid 106, inasmuch as one or more shielding flows may be concomitantly generated, so as to shield the immersion liquid from the etching flow, in a nested fashion. That is, the etching liquid 108 may possibly be confined in one or more shielding flows 107, 109, themselves confined in the immersion liquid 106, in a nested fashion.

Thanks to the HFC of the etching liquid 108 applied, one or more depressions (i.e., cavities) are formed within a superficial thickness of the substrate 118, in a controlled manner. I.e., the parameters controlling the HFC of the etching liquid 108 also control the resulting depression 120. The substrate 118 may further be controllably moved S80, in-plane, while maintaining the etching flow 108, such that a microchannel can be created, if necessary. That is, the substrate 118 may possibly be moved S80 in a plane parallel to the average plane of the substrate (e.g., using a motorized stage) while maintaining the HFC 108 of etching liquid, to form a microchannel 120 (or another microstructure) in the substrate 118. Therefore, the resulting substrate 118 can itself be regarded as a structured layer of a microfluidic device.

The proposed approach makes it possible to fabricate a substrate with functionalized microstructures, all within a same process. This allows a significant simplification of the fabrication process and gain in fabrication time. In particular, the present approach allows biofunctionalized chips to be obtained, opening new possibilities for biochip design.

Furthermore, the surface quality of the etched surface is optically clear, which is extremely useful for fluorescent-based detection and analysis. The proposed approach may find applications not only in the fields of diagnostics and analysis but also in tissue engineering, for example.

Figure 7:
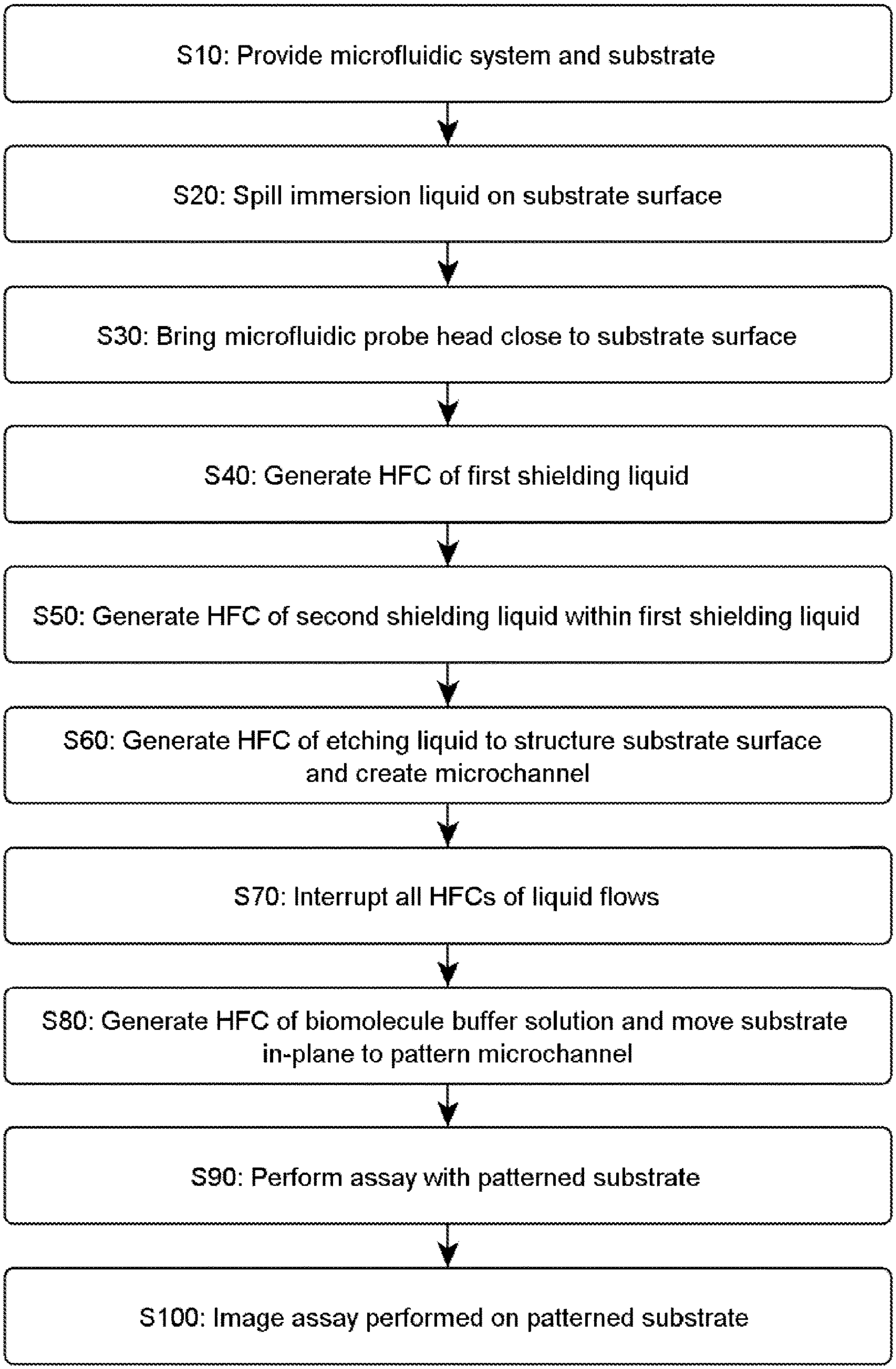
FIG. 7 is a flowchart illustrating high-level steps of a method of patterning a substrate, according to embodiments.

Advantageously, an assay may advantageously be performed S90 with the substrate 118, after having patterned S80 the depression(s) 120 with particles 122, as assumed in the flowchart of FIG. 7. In fact, the assay may be performed right after the patterning step S80. In addition, the substrate 118 may possibly be imaged S100 (e.g., by fluorescence imaging) while performing the assay, e.g., thanks to an imaging system 117 below the motorized stage 117, as assumed in FIG. 1.

The created depressions 120 are preferably patterned S80 by hydrodynamically confining the processing flow 121 inside the immersion liquid 106, vis-à-vis the depression 120. I.e., given that the setup is designed to allow HFCs to be obtained, an additional HFC can advantageously be relied on to allow particles 122 (e.g., biomolecules) to be controllably deposited in the depressions 120 formed. I.e., this additional HFC allows a selective deposition (patterning) of the particles In variants, the particles 122 may be deposited by merely ejecting the processing liquid 121, without aspirating it (no HFC is needed in that case). Note, in that respect, that a bilayer substrate 118 may possibly be used, in which the top layer is decomposed upon applying the etching HFC 108. This results in locally exposing the lower layer of the substrate, to which particles 122 subsequently adhere upon applying the processing flow 121. However, the particles may not adhere to unetched portions of the top layer, such that a selective patterning can also be achieved. However, it will likely be simpler to rely on an additional HFC to pattern the depressions.

The processing liquid 121 is preferably a solution, i.e., a liquid mixture in which the particles (the solute) are uniformly distributed within a solvent. In less likely variants, the processing liquid may also be a liquid suspension.

Note, the term "particles" should be understood in a broad sense, inasmuch as such particles may comprise or consist of biomolecules, metal particles, or polymer particles, for example. Thus, various types of particles can be contemplated, which may have various properties and dimensions. Still, the term "particles" refer to well-identified particles, i.e., particles that can be unambiguously characterized, e.g., optically, after the patterning step S80. In addition, such particles denote particle that one intentionally wants to deposit on the surface of the substrate, as opposed to impurities, debris, or dust particles that may accidentally come to adhere to this surface.

In preferred embodiments, the particles 122 are biomolecules, as assumed in FIGS. 2A-2C and 3A-3D. In particular, different types of biomolecules may be contained in the solution 121. The biomolecules come to contact the surface of the substrate 118 and are immobilized thereon. Such embodiments allow microstructures to be milled and biopatterned in a single process; they can notably be used to prototype and fabricate of biochips for microfluidic biomedical analyses. Controllably depositing biomolecules in the depression 120 via an HFC allows a clean functionalization of the substrate 118 to be achieved, such that an assay may possibly be performed S90 short after the deposition S80.

As noted earlier, the generated liquid flows may further include one or more shielding flows 107, 109 of shielding liquids. The shielding flows 107, 109 are generated S40, S50 prior to generating the etching flow 108. The flows 107, 109 are hydrodynamically confined inside the immersion liquid 106, e.g., in a nested fashion. The etching flow 108 is subsequently generated S60 so as to be hydrodynamically confined within a shielding flow 109, as depicted in FIG. 3C. Shielding liquids can advantageously be used to shield the immersion liquid 106 from the etching liquid 108. In variants, similar, intermediate liquid flows 107, 109 can be used to enable or promote a chemical reaction, for example.

Figure 3A:
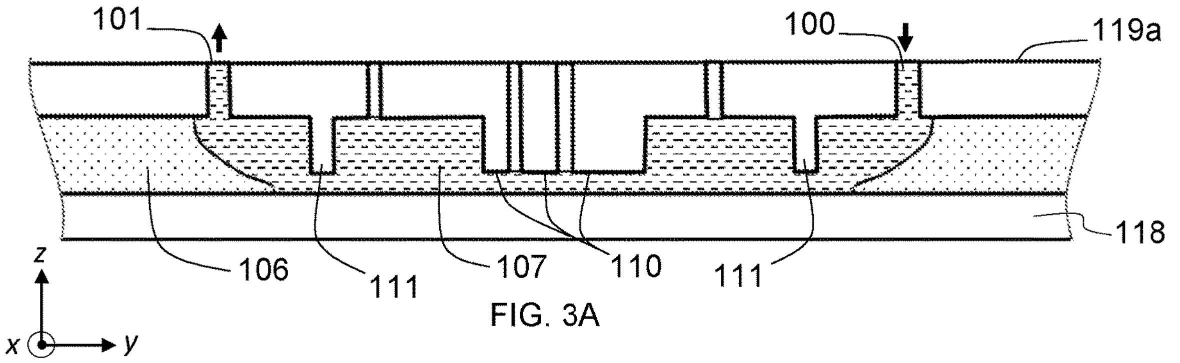
FIGS. 3A-3D are 2-dimensional (2D) cross-sectional views illustrating steps of structuring and functionalizing a substrate with a microfluidic probe head, similar to FIGS. 2A-2C, except that nested HFCs of liquids are involved, as in embodiments.
Figure 3B:
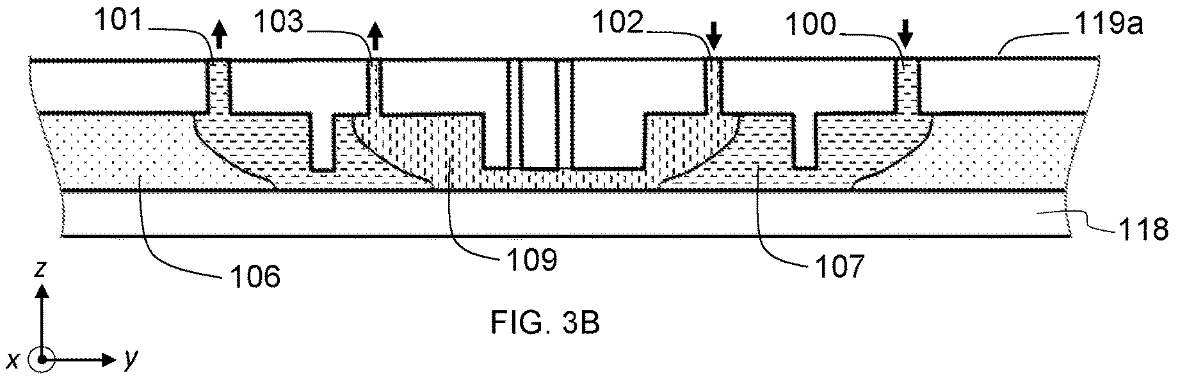
Figure 3C:
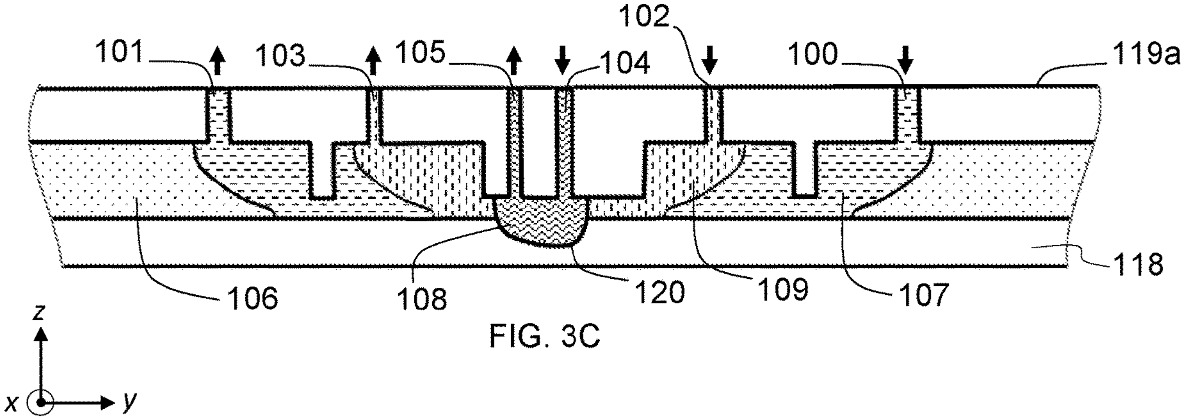
Figure 3D:
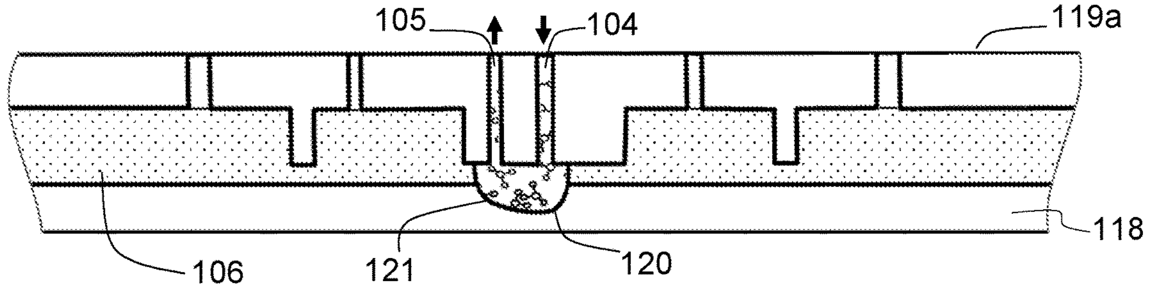

In particular, two shielding flows 107, 109 may be sequentially generated, in a nested fashion, as illustrated in FIGS. 3A-3B. That is, a first shielding flow 107 is generated at step S40 (FIG. 3A) prior to generating a second shielding flow 109, step S50 (FIG. 3B). Thus, the flows 107, 109, and 108, are sequentially (yet concomitantly) generated, see FIGS. 3A-3C. As a result, the first shielding flow 107 is hydrodynamically confined inside the immersion liquid 106, while the etching flow 108 is hydrodynamically confined within the second shielding flow 109, which is itself hydrodynamically confined within the first shielding flow 107. In other words, the successive flows are generated in a nested fashion, inwardly. Note, all flow confinements refer to liquid flows that are laterally confined in the plane (x, y) within another liquid flow or static liquid. A vertical confinement is otherwise ensured, between the processing surface of the probe head and the top surface of the substrate 118.

The substrate 118 may for example comprise polystyrene. In that case, the etching liquid 108 may advantageously comprise dichloromethane. The second shielding liquid 109 may for instance comprises ethanol, while each of the first shielding liquid 107 and the immersion liquid 106 may be an aqueous solution, i.e., water, or any bio-friendly liquid. In variants, the substrate 118 may comprise any suitable synthetic polymers or hydrogels and other acids or solvents may be used as etching liquid 108 in place of dichloromethane. For example, an ethylenediaminetetraacetic acid may be used as etching liquid for processing ionically crosslinked hydrogels (e.g., alginate, hyaluronic acid). As another example, potassium hydroxide or hydrofluoric acid can be used to etch metal oxides. For completeness, various immersion liquids can be relied on, and a range of shielding solutions 107, 109 are available, which can match such immersion liquids. For instance, a wide array of polar and non-polar solvents can be used to ensure matching miscibility, prevent surface tension-related instabilities, and unwanted chemical interactions (e.g., ethanol, acetone, water, and chloroform).

Besides, various types of microfluidic probe heads 119, 119*a-d* can be contemplated, as illustrated in FIGS. 2A-6. Typically, each of the flows 107, 109, 108, and 121, is generated by ejecting liquid via an aperture of the probe head and aspirating liquid between the processing surface of the probe head and the surface of the substrate 118. Distinct sets of pairs of apertured may be relied on, as assumed in FIGS. 3A-6 and contrary to FIGS. 2A-2B.

Various design parameters can be optimized, either independently or jointly, in order to optimize the liquid flows 107-109 and, in particular, to obtain optimal HFCs. To start with, the ratio between the flow rates of the ejected liquid and the aspirated liquid is preferably set between 1/3 to 1/20. The flow rates of the ejected liquid and the aspirated liquid will typically be, each, between 0.1 and 200 μl/min. The probe head can be connected to suitable pumping means 113, to generate the desired flow rates, as known per se. For completeness, one may ideally position S30 the probe head 119 such that a distance between the processing surface of the head and the exposed surface is between 20 and 500 μm. Larger distances may need be maintained, should the substrate surface be wavy (i.e., non-planar).

In practice, imposing such experimental parameters allows the surface of the substrate 118 to be controllably structured S60. The average dimension (depth and/or diameter) of the resulting depression(s) 120 will typically be between 1 and 500 μm. The depth is measured perpendicularly to an average plane of the substrate, i.e., along direction z in the accompanying drawings. The diameter of the created depression(s) 120 is measured in-plane, i.e., in the plane (x, y). And, as noted earlier, the substrate may possibly be moved in any direction in the plane (x, y), thanks to the motorized stage 116, see FIG. 1. Therefore, microchannels of any length (typically on the order of the centimeter) and shape (straight, bent, spiral, etc.) can potentially be etched/milled on the substrate 118, thanks to the applied flow 108.

Figure 2A:
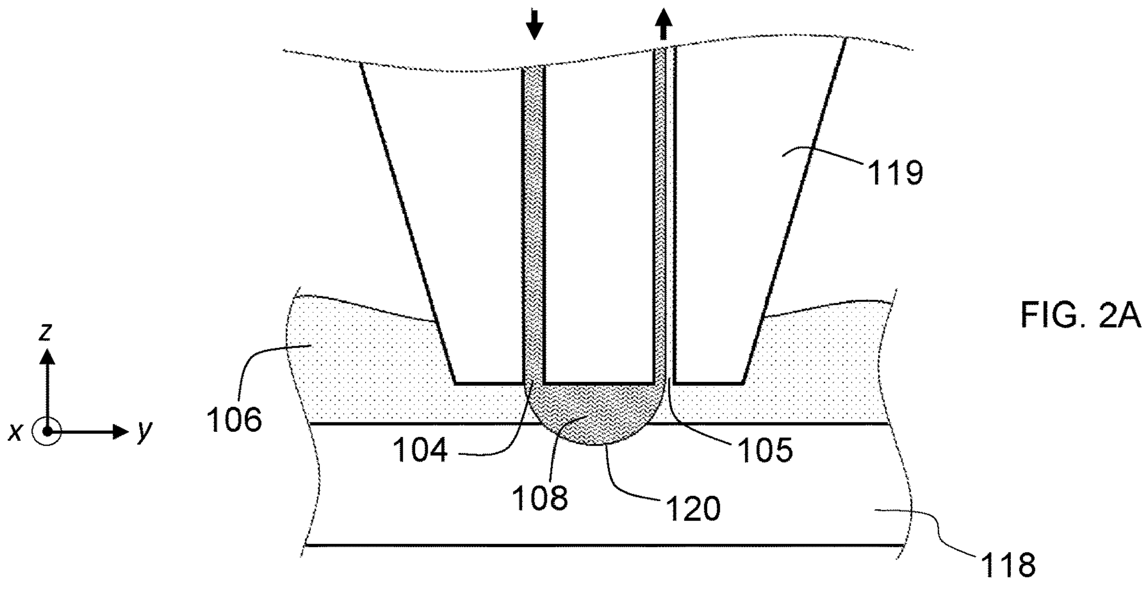
FIGS. 2A-2C are 2D cross-sectional views illustrating steps of structuring and functionalizing a substrate with a microfluidic probe head, where the substrate is structured via a hydrodynamic flow confinement (HFC) of an etching liquid and then patterned thanks to an HFC of a processing liquid that contains biomolecules, according to embodiments.
Figure 2B:
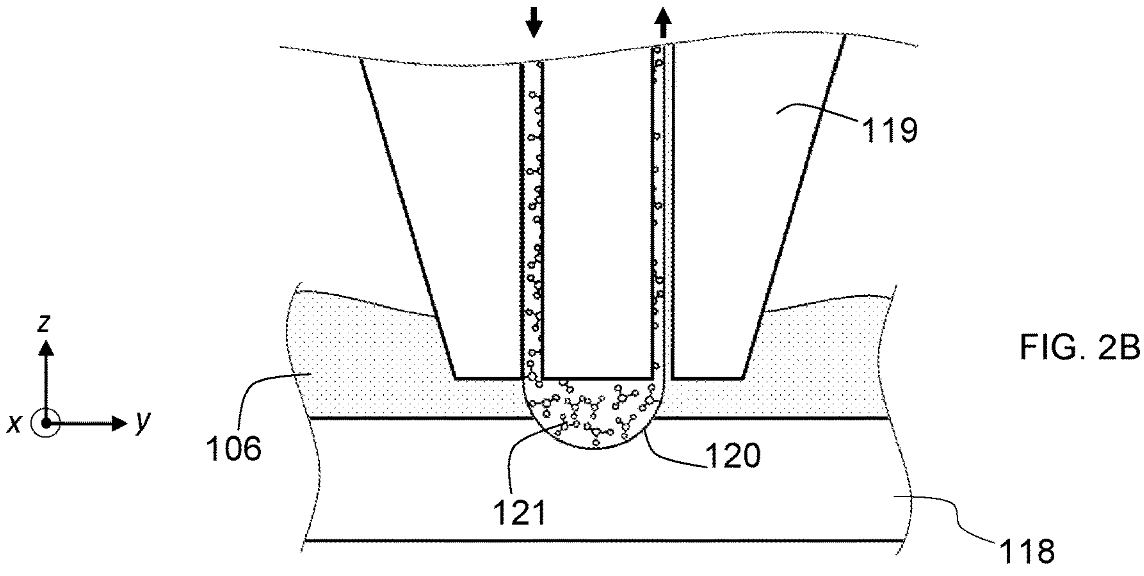
Figure 2C:
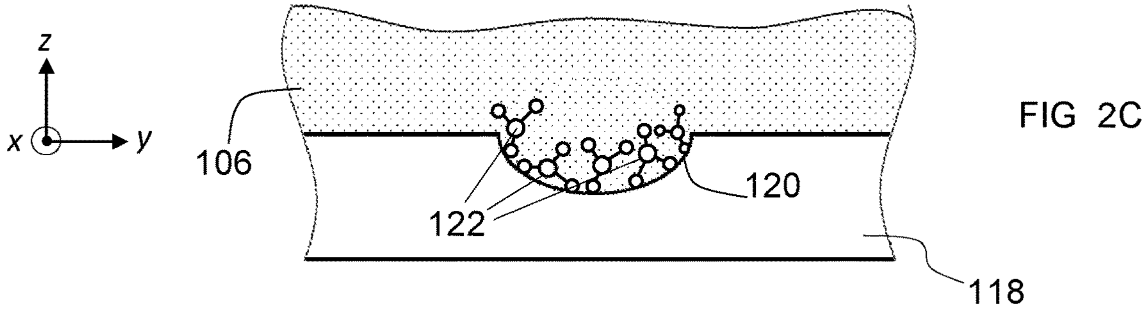

In the examples of FIGS. 2A, 2B, the processing surface of the probe head 119 is structured so as to comprise two apertures 104, 105 only. The apertures are formed by respective conduits extending through the probe head 119. They include a first aperture 104 for ejecting liquids 108, 121 toward the surface of the substrate 118. The corresponding conduit is connected to a liquid driving system 113 (see FIG. 1). In this example, the liquid driving system 113 is assumed to suitably switch liquid supplies provided to the conduit leading to aperture 104, whereby distinct liquids can sequentially be ejected via the same aperture 104. The second aperture 105 is for aspirating liquid 106, 108, 121 between the processing surface of the probe head 119 and the surface of the substrate 118. This aperture 105 is defined by a corresponding conduit, assumed to be connected to aspiration means (not shown) forming part of the liquid driving system 113. The system 113 may comprise usual equipment, such as, e.g., tubing ports, valves, pressure means, so as to allow HFCs of the liquids to be obtained. FIG. 2C shows the resulting substrate 118, once structured (a depression 120 is formed) and functionalized (biomolecules 122 are immobilized on the substrate 118 at the level of the depression 120).

In the examples of FIGS. 3A-3D, the processing surface of the probe head 119*a* is structured so as to comprise six apertures 100-105. As in the example of FIGS. 2A-2B, the aperture 104 is meant for ejecting liquids 108, 121 toward the surface of the substrate 118, while the aperture 105 is for aspirating liquid between the processing surface of the probe head 119 and the surface of the substrate 118, see FIGS. 3C, 3D. Additional apertures 100, 101, 102, 103 are provided, in order to allow additional liquid flows to be formed under the processing surface.

In embodiments such as illustrated in FIGS. 3A-6, the processing surface of the probe head 119 is structured to comprise at least four apertures (e.g., six or seven apertures, or more), including at least two apertures for ejecting liquid and at least two apertures for aspirating liquid. In the example of FIGS. 3A-3D, the processing surface of the probe head 119*a* comprises six apertures 100-105, in order to allow nested confinements of three liquid flows 108, 109, 107, see FIG. 3C. As explained earlier, the corresponding HFCs are sequentially generated, inwardly (compare FIGS. 3A, 3B, and 3C).

Figure 4:
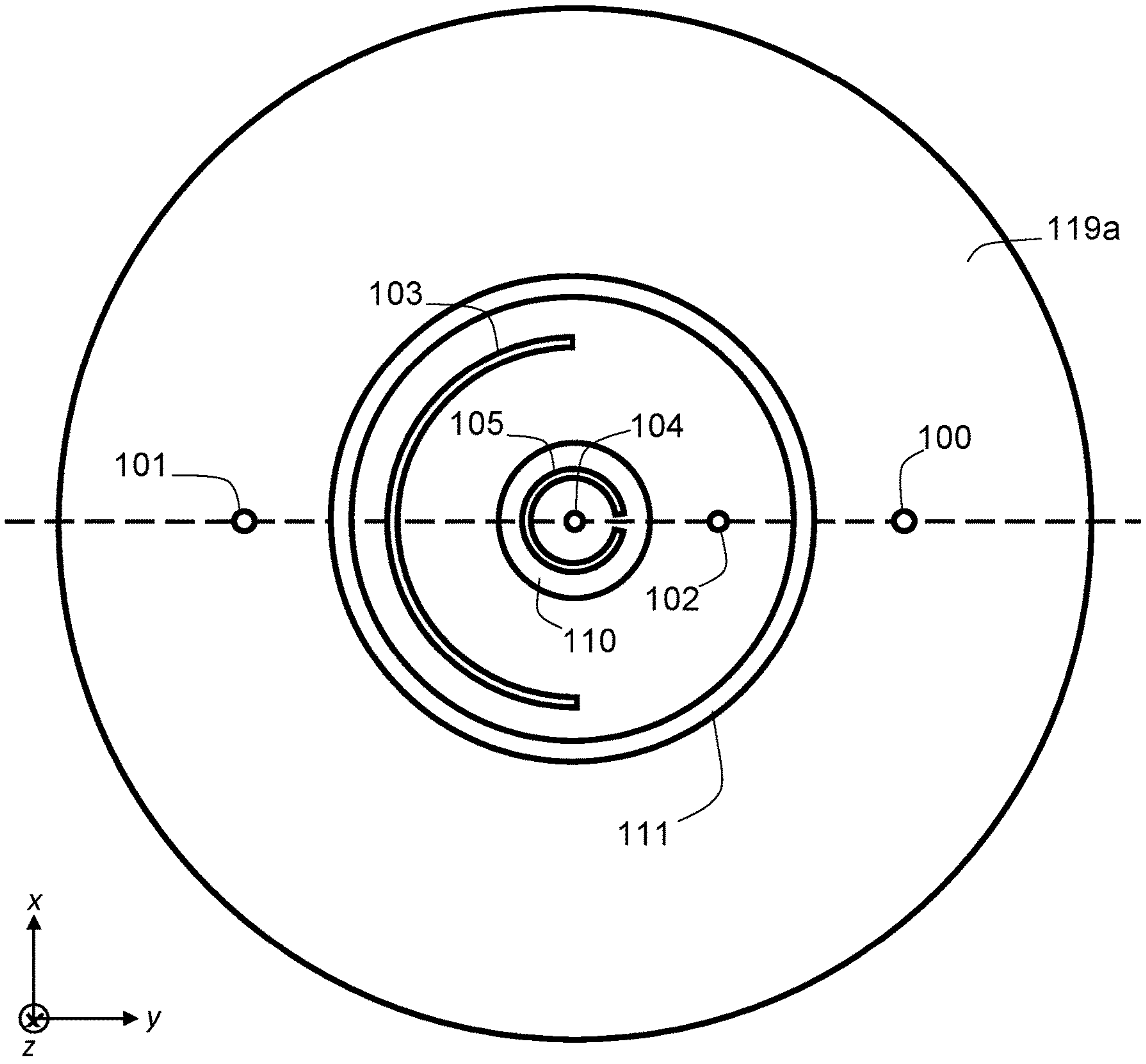
FIGS. 4 to 6 show processing surfaces of various microfluidic probe heads as used in embodiments. Note.

A front view of the corresponding processing surface is shown in FIG. 4. I.e., the processing surface is viewed from below (i.e., from the substrate 118). As seen in FIG. 4, the aspiration aperture 105 is curved and the aperture 104 is partly surrounded by the aperture 105 in this example. In variants, two or more curved aspiration apertures 305 may be relied on, whereby the ejection aperture 304 is partly surrounded by several aspiration apertures 305 in that case, see FIG. 6.

Figure 5:
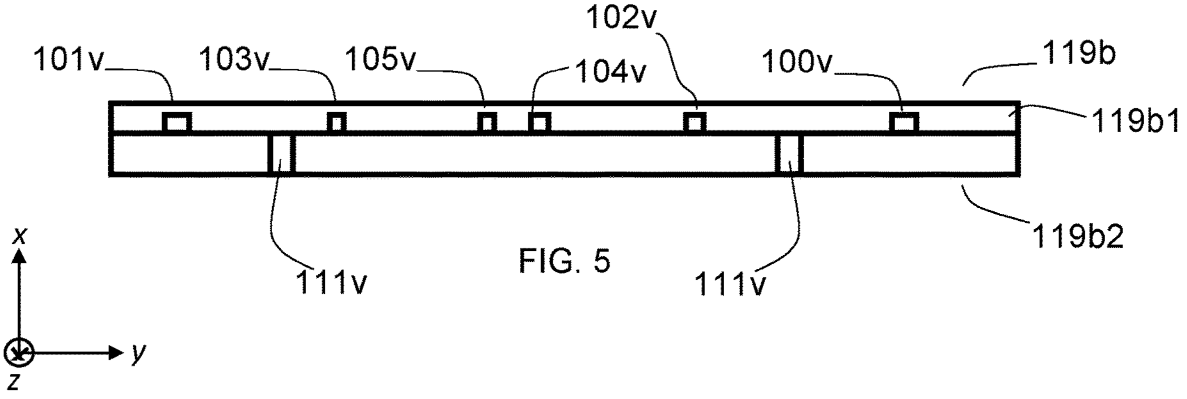

In other variants, the probe head 119*b* is configured as a two-layer device, see FIG. 5. In this example, the top-layer 119*b*1 is structured to form conduits, i.e., channels are grooved on a surface of the layer 119*b*1, and closed by the bottom layer 119*b*2, leading to apertures 100*v*, 101*v*, 102*v*, 103*v*, 104*v*, and 105*v*. The concept of the probe head shown in FIG. 5 is often referred to as a "vertical probe head". Posts 111*v* protrude from the processing surface, at the level of the bottom layer 119*b*2 in this example, to ensure a minimal gap between the processing surface and the processed surface of the substrate 118.

Figure 6:
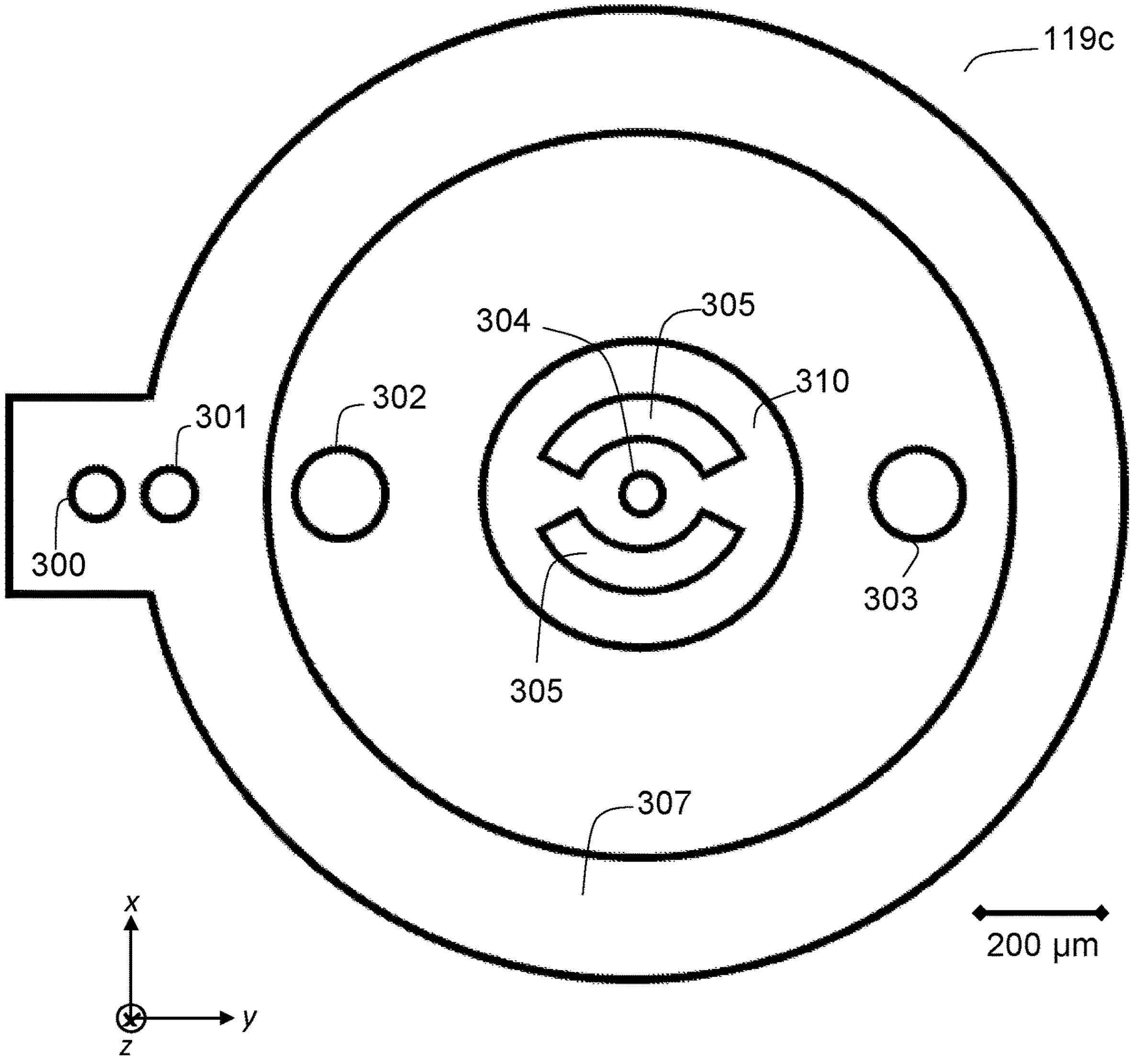

In the examples of FIGS. 4, 5, and 6, the apertures provided on the processing surface of the probe heads 119*a*, 119*b*, 119*c* are generally aligned. I.e., their projections in a plane (x, y) parallel to the processed surface of the substrate 118 is aligned. However, more sophisticated designs can be contemplated.

FIG. 6 shows another example of processing surface design; it shows the front side (apex) of a microfluidic chip 119*c*, where the inner set of apertures 304, 305, set on the central mesa 310, are used to create the milling confinement. The larger circular apertures 302, 303 set on the apex between the inner 310 and outer mesa 307 create the shielding confinement. The leftmost set of apertures 300, 301 set on the outer mesa 307 are used to create the bio-patterning confinement. The scale bar is 200 μm long.

All the microfluidic probe head designs discussed herein have been fabricated and tested by the Inventors. For example, the microfluidic probe head 119*c* has been used for integrated mechanical structuring and biofunctionalization of microfluidic channels on substrates, enabling rapid prototyping of biochips. Such a probe head can be used to create HFCs to localize the interaction between a fluid and a substrate to a microscale region. By confining organic solvents and scanning with the probe head 119*c* over the substrate surface, microchannels as deep as 90 μm are fluidically milled. Subsequently, by switching the confined fluid from a milling solution to a patterning solution, biomolecules are immobilized on the surface of the microchannel. For example, a biotin functionalized biochip can be fabricated in less than 5 min out of a polystyrene slide. Its functionalities were validated by implementing on-chip electrokinetic sample focusing, pressure driven flow, and a surface-based reaction.

In general, the probe heads 119, 119*a*-*d* are designed so to have conduits (e.g., microconduits) and/or channels (e.g., microchannels), leading to respective apertures, which may have any suitable shape (e.g., rounded, square, channel-like). In the present context, a microchannel can be formed as a groove on a main surface of a layer of the probe head, or be drilled or milled across such a layer, so as to extend parallel or transversely to this layer. This layer is for example a substrate, or any layer that is sufficiently thick to provide mechanical stability to the probe head, although mechanical stability may be provided by means of an additional layer of component of the probe head. The layer on which the microstructures are patterned may typically be an essentially planar object, notwithstanding a possible structuring. I.e., this layer may include various structures formed thereon, in particular microstructures, such as mesas or posts.

Preferably, a characteristic depth or diameter of the conduits or channels of the probe heads is in the micrometer-length range, i.e., between 1 μm and 500 μm. In fact, the dimensions of such conduits or channels should be suited for handling and working with the liquids involved (starting with the processing liquids), in terms of viscosity, density, and any other interface requirements. For instance, wider channels may be needed where the probe head interfaces with capillaries (tubings) and/or for handling viscous polymers, whereas the probe head may exhibit narrower channels closer to the apex and/or for handling low viscosity organic solvents, for example. Still, some particular structures of the probe heads may be in the nanoscale range or in the millimeter range, the probe heads as a whole typically being in the centimeter range.

Referring back to FIG. 1, another aspect of the invention is now described, which concerns a microfluidic system 1. Several aspects of this system have been explicitly or implicitly described in reference to the present methods. Such aspects are, accordingly, only briefly discussed in the following.

Basically, the system 1 comprises a first motorized stage 116, a second motorized stage 115, a liquid driving system 113, and a control unit 112. It preferably has a modular design.

The first motorized stage 116 includes a holder, which is designed to receive a substrate 118. In general, the first motorized stage 116 is configured to move the substrate parallel to a reference plane, i.e., parallel to the plane (x, y), in operation.

The second motorized stage 115 comprises a microfluidic probe head 119 mounted thereon. In general, the second motorized stage is configured to allow the microfluidic probe head 119 to be moved perpendicularly to the reference plane, i.e., along direction z, so to bring the probe head 119 closer to the substrate 118, in operation. If necessary, the stage 115 may be rotated/tilted at any angle, so as to be able to adjust the liquid ejection angle.

Preferably, the motorized stages 115, 116 are chosen so as to allow variable speed control for the sample holder and the microfluidic probe head (typically between 10 μm/s and 5 mm/s). Such motorized stages are known per se; as a whole, the elements 115, 116, 118, 119 can be compared to a non-contact scanning system. Each motorized stage typically includes a microcontroller, a stepper motor driver (with microstepping) and a stepper motor. High-end, mid-range, or off-the shelf the motorized stages can be contemplated.

The liquid driving system 113 includes liquid supplies (not shown) that are connected to the probe head 119, e.g., via tubing 114 and tubing ports (not shown), as schematically depicted in FIG. 1. Such liquid driving systems are known per se; they may include motorized elements, controllers, pumps, etc. The liquid supplies notably comprise an etching liquid supply and a processing liquid supply. They may additionally comprise supplies for the immersion liquid and the shielding liquids, as needed in applications.

The control unit (or control system) 112 may typically comprise a mini computer (e.g., Raspberry Pi Zero), as well as controller electronics. The unit 112 is adequately connected to each of the liquid driving system 113, the first motorized stage 116, and the second motorized stage 115, to allow the system 1 to be operated. In particular, the control unit 112, the liquid driving system 113, and the probe head 119 are together configured to sequentially generate flows of liquids supplied by the liquid supplies. Such flows are formed between the processing surface of the probe head 119 and the surface of the substrate 118. The generated flows can be hydrodynamically confined inside an immersion liquid 106 covering the surface of the substrate 118, as discussed earlier in reference to the present methods.

In embodiments, the liquid supplies additionally comprise a shielding liquid supply. In that case, the control unit 112, the liquid driving system 113, and the probe head 119, may be configured to generate nested flows of hydrodynamically confined liquids between the processing surface of the probe head 119 and the surface of the substrate 118, in operation of the system 1.

Consistently with the system 1 described above, the present methods may further comprise, prior to generating the liquid flows, connecting the probe head to liquid supplies of the liquid driving system 113, mounting the substrate 118 onto the motorized stage 116, and mounting the probe head to the motorized stage 115.

The above embodiments have been succinctly described in reference to the accompanying drawings and may accommodate a number of variants. Several combinations of the above features may be contemplated. Examples are given in the next section.

2. Specific Embodiments and Technical Implementation Details

2.1 First Example of Particularly Preferred Embodiment (FIGS. 1 and 2A-2C)

As depicted in FIGS. 1, and 2A-2C, a preferred approach for processing the surface of the substrate 118 in a wet environment utilizes a microfluidic probe head 119 and a non-contact scanning system 115, 116 (FIG. 1). This approach combines hydrodynamic confinement of liquids with precision motion control. The working principle of the microfluidic probe head 119 is depicted in FIG. 2A-2B. In this example, the probe is a microfluidic chip (similar to that of FIG. 5), which includes two microchannels leading to the tip ('apex') of the head. The apex is submerged within the immersion liquid 106 (e.g., water, buffers, cell medium) in proximity with the surface of the substrate 118. The aperture 104 and the corresponding channel are suitably connected to liquid supplies to inject liquid. The other aperture 105 and the corresponding channel are connected to pressuring means (allowing negative pressures) to aspirate liquid at a much higher flow rate than used to inject liquid. Thus, a continuous supply of immersion liquid 106 is needed to keep the substrate and the apex immersed. Thanks to the flow rate differential achieved, an HFC can be formed below the apex. Particles (e.g., chemicals) contained within the HFC 108 make contact with the surface of the substrate 118 over a well-defined footprint, limiting the interaction to controlled length scales ranging from tens of micrometers to several centimeters.

Using the microfluidic probe head 119 for confining an etching liquid 108 (compatible with the surface of the substrate 118) results in a highly localized fluidic milling of the surface of the substrate 118, in accordance with the confinement footprint. The same set of injection and aspiration channels (or an additional adjacent set, as in FIGS. 3A-3D) is then used to deliver a confined stream 121 of particles (e.g., biomolecules) 122 to the milled surface 120, so as to pattern the depression 120 formed.

The probe head 119 can be mounted in a setup as depicted in FIG. 1. The substrate 118 is set on a motorized (x, y) stage 116 atop an imaging system 117, which may notably include an inverted microscope. The microfluidic probe head 119 is set to a motorized z stage 115. Control of flow rates is achieved using a set of syringe pumps forming part of a liquid driving system 113. Coordination of the process is done through an adequately programmed controlled unit 112.

2.2 Second Example of Particularly Preferred Embodiment (FIGS. 1, 3A-3D, and 4)

A unique capability that is enabled by the flow confinements is the ability to utilize a wide variety of etching and/or milling liquids within a biofriendly aqueous environment. By adding additional injection and aspiration sites, one may incorporate outer "shielding" confinements between the milling confinement 108 and the immersion liquid 106, as depicted in FIG. 3C. This shielding confinement can notably be utilized to confine acids and/or solvents and prevent cross contamination.

This approach can be used for prototyping biochips, especially where there is a need for integration of biological elements with microstructures. This extends to the fabrication of microfluidic-based immunoassay biochips, patterning of DNA arrays in closed structures, and fabrication of single cell analysis devices.

In a further example, the system 1 comprises a liquid driving system 113 (for example including pressure, syringe, or electro-osmotic pumps), a series of capillaries 114, connecters and switches, motorized stages 115, 116, where a microfluidic probe 119*a* is mounted on the top stage 115 in place of the probe 119 and a substrate 118 is received on a holder of the bottom stage 116, a goniometer for controlling the location of the probe 119*a* with respect to the substrate 115, 116, and an imaging setup 117. All of these elements are controlled through a user interface on the control system 112.

As assumed in FIGS. 3A-3D, the microfluidic probe 119*a* is initially aligned and placed in proximity with the substrate 118 at a distance of 20-200 μm within an aqueous environment 106 (immersion liquid) on top of the substrate 118.

A set of apertures 100-105 are used to inject and aspirate liquids. In order to ensure suitable flow confinements of the liquids, a flow rate ratio of 1/3 to 1/20 (injection to aspiration) is maintained. Flow rates for injection and aspiration are in the range of 0.1-200 μl/min.

The milling process is initiated through the confinement of three different liquids in nested hierarchical confinements 107, 108, 109, see FIG. 3C. The confinements are initiated from the outermost liquid, inwardly. For example, one may mill polystyrene using dichloromethane. A confined liquid (e.g., water) 107 shields the outermost immersion liquid 106 from inner liquids (solvents) to prevent diffusive contamination. This confinement 107 is achieved by injecting an etching liquid from the outer injection channel 100 (FIG. 3A) and aspirating (essentially this liquid 107) from the opposite aspiration channel 101. The middle confinement (ethanol) 109 is then initiated, see FIG. 3B.

The middle confinement 109 ensures that the upcoming inner confinement 108 (FIG. 3C) does not interact with the outer flow confinement 107. This confinement 109 is realized by injecting from the injection aperture 102 and aspirating from the aspiration aperture 103. Finally, the inner confinement (dichloromethane) 108 is initiated, beginning the milling process as the dichloromethane comes in contact with the substrate 118, see FIG. 3C. This confinement is achieved by injecting from the injection aperture 104 and aspirating from the aperture 105.

Once the inner flow confinement 108 is initiated, the milling process occurs as the solvent mills away the substrate 118. The depth and cross section of the milled microchannel 120 can then be controlled and altered by changing the injection and aspiration rates as well as the scanning speed and distance between the probe 119*a* and the top surface of the substrate 118. For example, the depth and width of the depression formed may range from 1 to 500 μm.

Scanning with the probe 119*a* over the substrate 118 is facilitated by the motorized stages 115, 116. Note, the shape, size, and in-plane arrangement of the injection 100, 102, 104 and aspiration apertures 101, 103, 105 may differ, depending on the desired application.

Once the milling step is completed, the inner confinement 108 is interrupted and the liquid supply is then switched (either on or off the microfluidic chip); it is preferably switched automatically by the system 113, off the chip. An additional, inner confinement 121 is then started, FIG. 3D, which may for example consist of a buffer containing biomolecules. The biomolecules are deposited and immobilized on the surface of the substrate 118. Scanning the probe 119*a* over the surface of the milled channel 120 allows the channel 120 to be adequately patterned by biomolecules, i.e., a selective patterning is achieved.

One of the parameters enabling the above-mentioned method is the distance between the apertures and the surface of the substrate 118. Higher volume confinements can easily be achieved by increasing the distance between the apertures and the substrate 118.

The processing surface (or apex) may further comprise a mesa 110 (compare FIGS. 3A and 4), in order to optimize the middle confinement 109 and adequately shield the inner flow confinement 108, inasmuch as the mesa 110 force the inner flow 108 to be closer to the substrate surface. Additional barriers 111 are provided to help separating the outer confinement 107 from the middle confinement 109. The barriers cause the inner confinement 108 to essentially interact with the substrate 118 and the middle confinement 109. The height of the mesa 110 and the barriers 111 is typically between 1 and 100 μm.

2.3 Example of Operation Flow

As illustrated in FIG. 7, a preferred flow of operation is the following. Some of the numeral references further refer to FIGS. 1 and 3A-3D. At step S10, a microfluidic system 1 and a substrate 118 are provided. The substrate 118 is mounted in a holder of the motorized stage 116 of the system 1. At step S20, immersion liquid is spilled over the substrate surface, e.g., using the probe head or an additional liquid inlet. At step S30, the microfluidic probe head is brought in close proximity with the substrate surface. At step S40, an HFC of first shielding liquid is generated. At step S50, an HFC of a second shielding liquid is generated so as for the second HFC to be nested in the HFC of the first shielding liquid. At step S60, an HFC of etching liquid is generated to structure the substrate surface. The stage 116 concomitantly moves the substrate 118 to create a microchannel. At step S70, all HFCs are interrupted. At step S80, a new HFC of a biomolecule buffer solution is generated and the substrate in concomitantly moved in-plane to pattern the previously obtained microchannel. At step S90, an assay is performed using the patterned substrate. The assay is imaged using an imaging system 117 at step S100. I.e., steps S90 and S100 are concomitant.

In an embodiment, a method of patterning a substrate can be provided. There can be a substrate and a microfluidic probe head. The surface of the substrate is covered by an immersion liquid and the probe head is positioned in proximity with the surface of the substrate, so as to immerse a processing surface of the probe head in the immersion liquid. Next, liquid flows are generated between the processing surface of the probe head and the surface of the substrate, via the probe head. The liquid flows generated include an etching flow of an etching liquid (e.g., an acid or solvent) and a processing flow of a processing liquid (e.g., a solution or suspension). The etching flow is hydrodynamically confined inside the immersion liquid to controllably structure the surface of the substrate, which causes to create a depression in the substrate. The processing flow is generated after having interrupted the etching flow. The processing flow generated causes to pattern the depression created with particles (e.g., biomolecules) contained in the processing liquid. Related microfluidic systems can also be provided.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, even though specific setups and methods have been described above, there are many ways to implement the present methods for various applications, e.g., using different microfluidic chip geometries. In order to attain different shapes of flow confinements and different levels of shielding and interfaces between the different flow confinements, a number of design features can be adjusted (e.g., injection and aspiration aperture locations, shapes, and sizes). Furthermore, various flow rates can be contemplated. Moreover, in variants to biomolecules, the patterning process may involve liquids containing metal or polymer particles. The middle and outer confinements may serve to shield or prevent cross contamination. In variants, they may be leveraged to facilitate a chemical reaction between the solutions.

What is claimed is:

1. A method of patterning a substrate, the method comprising:

providing the substrate and a microfluidic probe head;

covering a surface of the substrate by an immersion liquid and positioning the probe head in proximity with the surface of the substrate to immerse a processing surface of the probe head in the immersion liquid; and via the probe head, generating liquid flows between the processing surface of the probe head and the surface of the substrate, wherein the liquid flows generated include:

an etching flow of an etching liquid that is hydrodynamically confined inside the immersion liquid to controllably structure the surface of the substrate by creating a depression in the substrate; and a processing flow of a processing liquid, wherein the processing flow is generated after having interrupted the etching flow, to pattern the depression created with particles contained in the processing liquid.

2. The method according to claim 1, wherein the depression created is patterned by hydrodynamically confining the processing flow inside the immersion liquid, vis-à-vis the depression.

3. The method according to claim 2, wherein said particles are biomolecules.

4. The method according to claim 1, wherein the method further comprises moving the substrate in a plane parallel to an average plane of the substrate while maintaining the hydrodynamically confined flow of etching liquid, to form a microchannel in the substrate.

5. The method according to claim 1, wherein the generated liquid flows further comprise a shielding flow of a shielding liquid, wherein the shielding flow is generated prior to generating the etching flow and is hydrodynamically confined inside the immersion liquid, and the etching flow is subsequently generated so as to be hydrodynamically confined within the shielding flow.

6. The method according to claim 5, wherein said shielding flow is a second flow and said shielding liquid is a second shielding liquid, and the generated liquid flows further comprise a first shielding flow of a first shielding liquid, wherein the first shielding flow is generated prior to generating the second shielding flow and is hydrodynamically confined inside the immersion liquid, whereby the etching flow is hydrodynamically confined within the second shielding flow, which is itself hydrodynamically confined within the first shielding flow.

7. The method according to claim 6, wherein the substrate comprises polystyrene and the etching liquid comprises dichloromethane.

8. The method according to claim 7, wherein the second shielding liquid comprises ethanol.

9. The method according to claim 8, wherein each of the first shielding liquid and the immersion liquid comprises water.

10. The method according to claim 6, wherein each of the first shielding flow, the second shielding flow, the etching flow, and the processing flow, is generated by ejecting liquid via an aperture of the probe head and aspirating liquid between the processing surface of the probe head and the surface of the substrate, and a ratio between flow rates of the ejected liquid and the aspirated liquid is between 1/3 to 1/20.

11. The method according to claim 10, wherein said flow rates are, each, between 0.1 and 200 μl/min.

12. The method according to claim 10, wherein the probe head is positioned so as for the processing surface to be at a distance from the surface of the substrate, said distance being between 20 and 200 μm.

13. The method according to claim 1, wherein the surface of the substrate is controllably structured so as for one or each of an average depth, and an average diameter of the created depression to be between 1 and 500 μm.

14. The method according to claim 1, wherein the method further comprises, after having patterned the depression with particles, performing an assay with the patterned substrate.

15. The method according to claim 1, wherein the processing surface of the probe head is structured so as to comprise at least two apertures, these including a first aperture for ejecting liquid toward the surface of the substrate and a second aperture for aspirating liquid between the processing surface of the probe head and the surface of the substrate.

16. The method according to claim 15, wherein the second aperture is curved and the first aperture is at least partly surrounded by the second aperture.

17. The method according to claim 15, wherein the processing surface of the probe head is structured so as to comprise at least four apertures, these including at least two apertures for ejecting liquid toward the surface of the substrate and at least two apertures for aspirating liquid between the processing surface of the probe head and the surface of the substrate.

* * * * *